(12) United States Patent
Mantri et al.

(10) Patent No.: US 10,509,476 B2
(45) Date of Patent: Dec. 17, 2019

(54) ENHANCED DEVICE AUTHENTICATION USING MAGNETIC DECLINATION

(71) Applicant: Verizon Patent and Licensing Inc., Arlington, VA (US)

(72) Inventors: Viraj C. Mantri, Hyderabad (IN); Shivaramakrishna Nyshadham, Hyderabad (IN); Prateek Mehrotra, Hyderabad (IN); Vishal Bhasin, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 159 days.

(21) Appl. No.: 14/790,518

(22) Filed: Jul. 2, 2015

(65) Prior Publication Data

US 2017/0004293 A1    Jan. 5, 2017

(51) Int. Cl.

| G06F 21/32 | (2013.01) |
|---|---|
| G06F 3/01 | (2006.01) |
| G06F 1/16 | (2006.01) |
| G06F 21/31 | (2013.01) |
| H04W 12/02 | (2009.01) |
| H04W 12/00 | (2009.01) |

(52) U.S. Cl.
CPC ............ *G06F 3/017* (2013.01); *G06F 1/1694* (2013.01); *G06F 21/31* (2013.01); *H04W 12/02* (2013.01); *G06F 2221/2111* (2013.01); *H04W 12/00508* (2019.01)

(58) Field of Classification Search
CPC ................................ G06F 21/32; G06F 3/017

USPC ............................................................ 726/19
See application file for complete search history.

(56) References Cited

U.S. PATENT DOCUMENTS

| 7,451,549 | B1 * | 11/2008 | Sodhi .................... G01C 17/38 33/356 |
|---|---|---|---|
| 7,602,301 | B1 * | 10/2009 | Stirling ................ A61B 5/1124 340/573.1 |
| 8,346,217 | B2 * | 1/2013 | Crawford .............. H04W 12/06 455/410 |
| 9,141,150 | B1 * | 9/2015 | Trundle ................ G06F 1/1694 |
| 9,151,610 | B2 * | 10/2015 | Chow .................... G01C 17/38 |
| 9,300,645 | B1 * | 3/2016 | Rao ........................ H04L 63/08 |
| 9,355,237 | B2 * | 5/2016 | Peterson ................ G06F 21/32 |
| 9,564,046 | B2 * | 2/2017 | Breedvelt-Schouten .................... G08C 17/02 |
| 9,606,643 | B2 * | 3/2017 | Aguera-Arcas ..... G06F 3/03547 |
| 9,639,682 | B2 * | 5/2017 | North .................. G07C 9/00158 |
| 9,772,815 | B1 * | 9/2017 | Medina ................. G06F 3/0346 |

(Continued)

*Primary Examiner* — Jahangir Kabir

(57) ABSTRACT

Techniques described herein may allow for an enhanced authentication of a user of a user device, such as a mobile telephone. Some such techniques may be applicable when transitioning the user device from a locked state to an unlocked state. The user device may determine an orientation associated with the user device (e.g., a magnetic declination, which may be expressed in terms of degrees from north), and may output the direction to an authentication server. The authentication server may determine whether the orientation matches a previously stored orientation, and may indicate to the user device whether the user device should activate a public mode or a private mode. The authentication server may also notify one or more application servers regarding the mode of the user device. In private mode, the presenting, sending, or receiving of certain types of data (e.g., sensitive data) may be restricted.

20 Claims, 8 Drawing Sheets

(56) References Cited

U.S. PATENT DOCUMENTS

| | | | |
|---|---|---|---|
| 9,876,788 B1* | 1/2018 | Ziraknejad | G06F 21/45 |
| 2006/0021003 A1* | 1/2006 | Fisher | G06F 21/32 |
| | | | 726/1 |
| 2007/0150827 A1* | 6/2007 | Singh | G06F 3/011 |
| | | | 715/773 |
| 2007/0241861 A1* | 10/2007 | Venkatanna | G06F 21/32 |
| | | | 340/5.52 |
| 2009/0170532 A1* | 7/2009 | Lee | H04M 1/72566 |
| | | | 455/456.3 |
| 2009/0265105 A1* | 10/2009 | Davis | G01C 21/20 |
| | | | 701/300 |
| 2010/0008255 A1* | 1/2010 | Khosravy | G01C 21/20 |
| | | | 370/254 |
| 2010/0100972 A1* | 4/2010 | Lemieux | G06F 21/57 |
| | | | 726/34 |
| 2010/0124735 A1* | 5/2010 | Chen | G06F 3/0484 |
| | | | 434/284 |
| 2010/0275258 A1* | 10/2010 | Kamakura | G06F 21/32 |
| | | | 726/19 |
| 2011/0016534 A1* | 1/2011 | Jakobsson | G06F 21/316 |
| | | | 726/28 |
| 2011/0061100 A1* | 3/2011 | Mattila | G06F 3/017 |
| | | | 726/17 |
| 2011/0153250 A1* | 6/2011 | Bailey | G01C 17/38 |
| | | | 702/94 |
| 2011/0237274 A1* | 9/2011 | Wong | G01S 1/68 |
| | | | 455/456.1 |
| 2012/0019674 A1* | 1/2012 | Ohnishi | G08C 17/00 |
| | | | 348/207.1 |
| 2012/0036556 A1* | 2/2012 | LeBeau | G06F 3/048 |
| | | | 726/3 |
| 2012/0151223 A1* | 6/2012 | Conde Marques | G06F 21/575 |
| | | | 713/193 |
| 2012/0203663 A1* | 8/2012 | Sinclair | G06F 21/30 |
| | | | 705/26.41 |
| 2013/0007842 A1* | 1/2013 | Park | G06F 21/74 |
| | | | 726/3 |
| 2013/0088420 A1* | 4/2013 | Kang | G06F 3/013 |
| | | | 345/156 |
| 2013/0120240 A1* | 5/2013 | Hong | G06F 3/03 |
| | | | 345/156 |
| 2013/0159217 A1* | 6/2013 | Davis | H04L 63/10 |
| | | | 705/400 |
| 2013/0167221 A1* | 6/2013 | Vukoszavlyev | G06F 1/1694 |
| | | | 726/16 |
| 2013/0219289 A1* | 8/2013 | Anton | G06F 3/01 |
| | | | 715/748 |
| 2013/0247117 A1* | 9/2013 | Yamada | G08C 17/02 |
| | | | 725/93 |
| 2013/0263251 A1* | 10/2013 | Fleizach | G06F 3/04883 |
| | | | 726/19 |
| 2014/0033326 A1* | 1/2014 | Chien | H04W 12/08 |
| | | | 726/28 |
| 2014/0082569 A1* | 3/2014 | Borgman | G06F 21/35 |
| | | | 715/863 |
| 2014/0096178 A1* | 4/2014 | Shippy | G06F 21/316 |
| | | | 726/1 |
| 2014/0123275 A1* | 5/2014 | Azar | H04W 12/06 |
| | | | 726/19 |
| 2014/0129136 A1* | 5/2014 | Celia | G01C 21/00 |
| | | | 701/445 |
| 2014/0157402 A1* | 6/2014 | Boss | G06F 21/36 |
| | | | 726/19 |
| 2014/0201666 A1* | 7/2014 | Bedikian | G06F 3/017 |
| | | | 715/771 |
| 2014/0201690 A1* | 7/2014 | Holz | G06F 3/017 |
| | | | 715/863 |
| 2014/0210703 A1* | 7/2014 | Narasimhan | G06F 21/36 |
| | | | 345/156 |
| 2014/0267064 A1* | 9/2014 | Lu | G06F 3/041 |
| | | | 345/173 |
| 2014/0289820 A1* | 9/2014 | Lindemann | G06Q 20/42 |
| | | | 726/5 |
| 2015/0067823 A1* | 3/2015 | Chatterton | G06F 21/32 |
| | | | 726/19 |
| 2015/0156313 A1* | 6/2015 | Zeng | G06F 3/04817 |
| | | | 455/411 |
| 2015/0161371 A1* | 6/2015 | Hoshi | G06F 21/35 |
| | | | 726/19 |
| 2015/0186661 A1* | 7/2015 | Hirase | G06F 21/32 |
| | | | 726/28 |
| 2015/0200921 A1* | 7/2015 | Linga | G06F 21/44 |
| | | | 713/171 |
| 2015/0235016 A1* | 8/2015 | Sun | G06F 21/35 |
| | | | 726/19 |
| 2016/0147989 A1* | 5/2016 | Venkata Dongala | G06F 21/36 |
| | | | 726/19 |

* cited by examiner

| User ID | Privacy preferences |
|---|---|
| 123-456-7890 | |
| 321-654-0987 | |
| 111-222-3333 | |

| Application ID | Application server URL | Direction | Padding | Privacy settings |
|---|---|---|---|---|
| <global> | | 177° | 3° | |
| Stocks | foostocks.com/auth.html | | | <No buy/sell, no account balance> |
| Banking | barbank.com/userauth.html | 290° | 2° | <Restrict bill, account number, transfers> |

Local rotation and magnetic declination used for authentication

Device movement and magnetic declination used for authentication

ENHANCED DEVICE AUTHENTICATION USING MAGNETIC DECLINATION

BACKGROUND

Applications, or "apps," that run on mobile devices often feature sensitive information. For example, a banking app may send and/or receive user account information, such as account balances, transaction histories, usernames and/or passwords, etc., to and/or from a bank's website. In some situations, a user may open an app while on a private network (e.g., the user's home wireless network), and may reopen the app at a later time while on a public network (e.g., at an airport, a mall, a coffee shop, etc.). When reopening the app, sensitive information may be sent and/or received by the user's mobile device, which may potentially expose the sensitive information to malicious individuals.

DETAILED DESCRIPTION OF PREFERRED EMBODIMENTS

The following detailed description refers to the accompanying drawings. The same reference numbers in different drawings may identify the same or similar elements.

Some implementations, describe herein, may provide for the authentication of a user of a user device, using a magnetic declination of the user device (e.g., an orientation of the user device, such as a direction in which the user device is facing, or aligned, relative to conventional north, south, east, or west directions), to enhance the effectiveness of traditional authentication techniques. In accordance with some implementations, the enhanced authentication may cause applications on the user device to refrain from presenting, sending, and/or receiving sensitive information (e.g., personal information, financial information, etc.) when the user device is authenticated in a "public" mode, and may allow such information to be presented, sent, and/or received when the user device is authenticated in a "private" mode. The private mode may be activated when the user device is oriented a certain way (e.g., facing a particular predetermined direction (e.g., north, south, east, or west)), and the public mode may be activated when the user device is not oriented in that certain way (e.g., is not facing the particular predetermined direction). This enhanced authentication procedure may prevent a malicious user, who knows the user's authentication information (e.g., the devices' unlock personal identification number ("PIN") but not the direction) from accessing the user's personal information. The enhanced authentication procedure may also allow the user to cause applications on the device from sending and/or receiving sensitive information over an untrusted network, thereby further enhancing the user's security.

Figure 1:
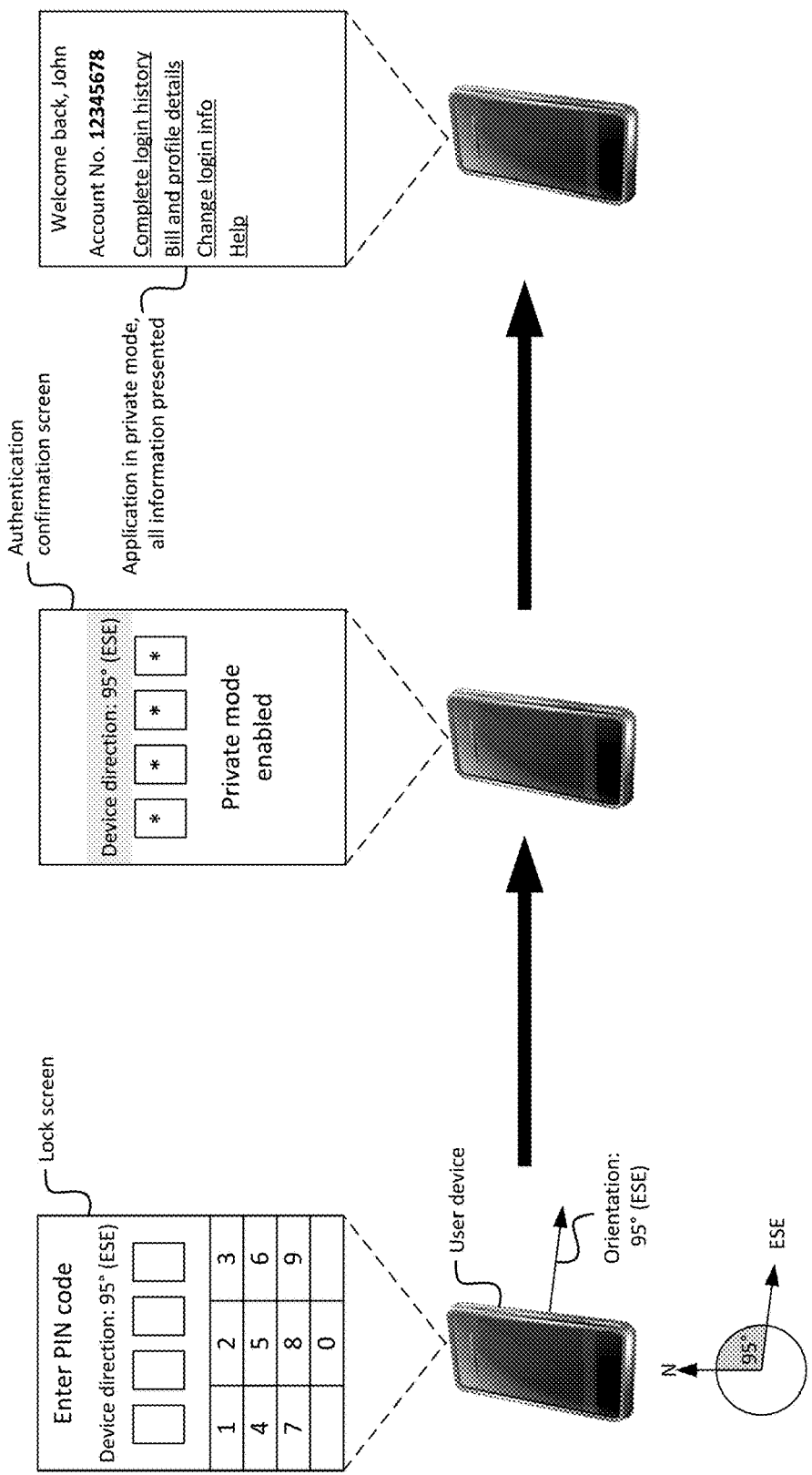
FIGS. 1 and 2 illustrate an example overview of implementations described herein, in which the magnetic declination of a user device (e.g., an orientation of the user device, which may be based on a direction in which the user device is facing or aligned) may be used in an enhanced authentication procedure.
Figure 2:
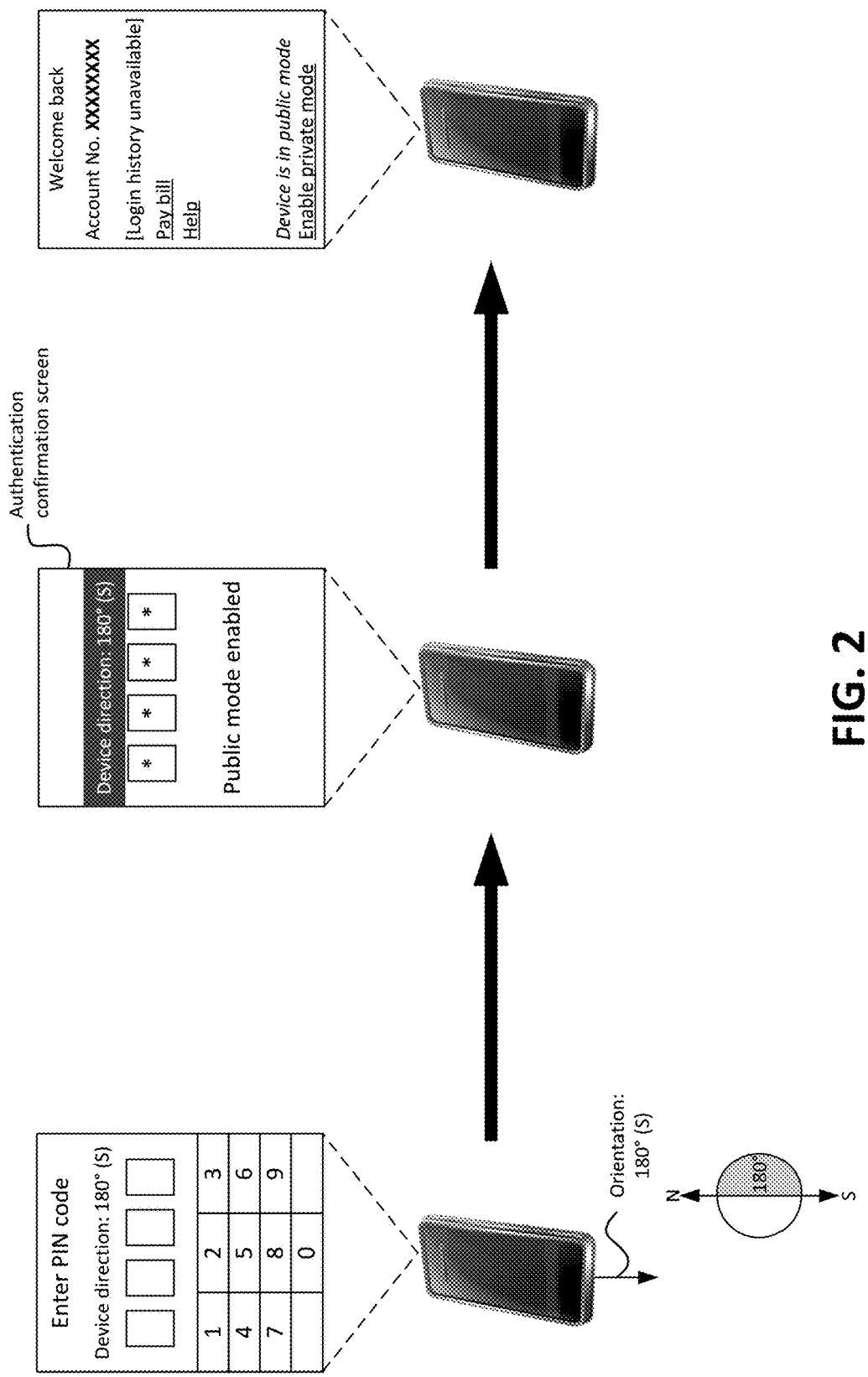

FIGS. 1 and 2 illustrate examples of some implementations described herein. For example, as shown in FIG. 1, a user device may present a lock screen. The lock screen may be presented after a user "locks" the user device (e.g., by explicitly pressing a "lock" button, and/or automatically, after a period of inactivity). In this example, the user device may be oriented toward a particular direction—specifically, in this example, 95 degrees from north (or, approximately speaking, east-southeast ("ESE")). As further shown, the lock screen may display the device direction ("Device direction: 95° (ESE)"). The lock screen may further include keys (e.g., 0-9), which the user may push to enter a PIN code (e.g., a 4-digit PIN code) to unlock the phone. Additionally, or alternatively, the lock screen may feature other techniques for the user to enter authentication information, such as a swipe pattern, biometric information (e.g., voice recognition, fingerprint recognition, or other biometric information), etc.

As described below, the user may have previously set a device direction that is associated with a private mode. Assume, for the sake of the example of FIGS. 1 and 2, that the previously-set direction is 95 degrees from north. After the user enters a valid PIN code, and further based on the device being oriented towards the previously-set direction, the device may be unlocked and may be set to a private mode. As shown in FIG. 1, an authentication confirmation screen may be presented (e.g., briefly, such as for one second or for less than one second), which indicates that the user device has been unlocked and set to private mode. For example, the message "Private mode enabled" may be displayed on the authentication confirmation screen. As another example, the text indicating the device direction may be highlighted or shaded (e.g., a green color) to indicate that the private mode has been enabled.

In private mode, applications may present sensitive or personal information, and/or may send and/or receive such information to and/or from an external device (e.g., a web server). In some implementations, the private mode may not place any restrictions on the types of information that may be presented, sent, and/or received by applications of the user device (in contrast with public mode, an example of which is described below with respect to FIG. 2).

In FIG. 2, the user device may be oriented towards 180 degrees from north (i.e., south ("S")). As noted above, this direction may be different from the previously-set direction associated with private mode (i.e., 95 degrees from north, in these examples). As further shown, the authentication confirmation screen may be displayed when the user inputs valid authentication credentials (e.g., the correct four-digit PIN code), but when the user device is not oriented towards the direction associated with private mode (i.e., is facing 180 degrees from north, instead of 95 degrees from north). The authentication confirmation screen, in this figure, may indicate that public mode is enabled. The text indicating the device direction may also be highlighted or shaded (e.g., a different color than the highlighting or shading in FIG. 1, such as red).

As further shown, when the device is in private mode, the amount or types of information may be different than those shown in public mode (e.g., the information presented, sent, and/or received by the user device may be restricted). For instance, the user's account number may not be displayed. Additionally, or alternatively, the user's account number may not be sent by the user device (e.g., to a web server, via the Internet and/or another network), and/or the user's account number may not be sent to the user device (e.g., by a web server). Furthermore, other types of information or selection options may be unavailable (e.g., "Login history unavailable" may be presented, and the "Change login info" option may not be presented). Also, some information or selection options may be modified, as compared to the private mode. For example, referring to FIG. 1, the private mode may feature a "Bill and profile details," while the public mode, shown in FIG. 2, may feature a more restrictive "Pay bill" option.

In some implementations, the public mode may include a notification that the user device is in public mode ("Device is in public mode"). When in public mode, the user device may provide an option for the user to enable private mode (e.g., may request additional credentials). Providing the option for additional credentials may be useful in situations where the user is unable to remember the direction associated with private mode, and/or in which the user is otherwise unable or unwilling to orient the device towards the particular direction (e.g., while traveling in a bus, sitting in a movie theater, etc.).

Figure 3:
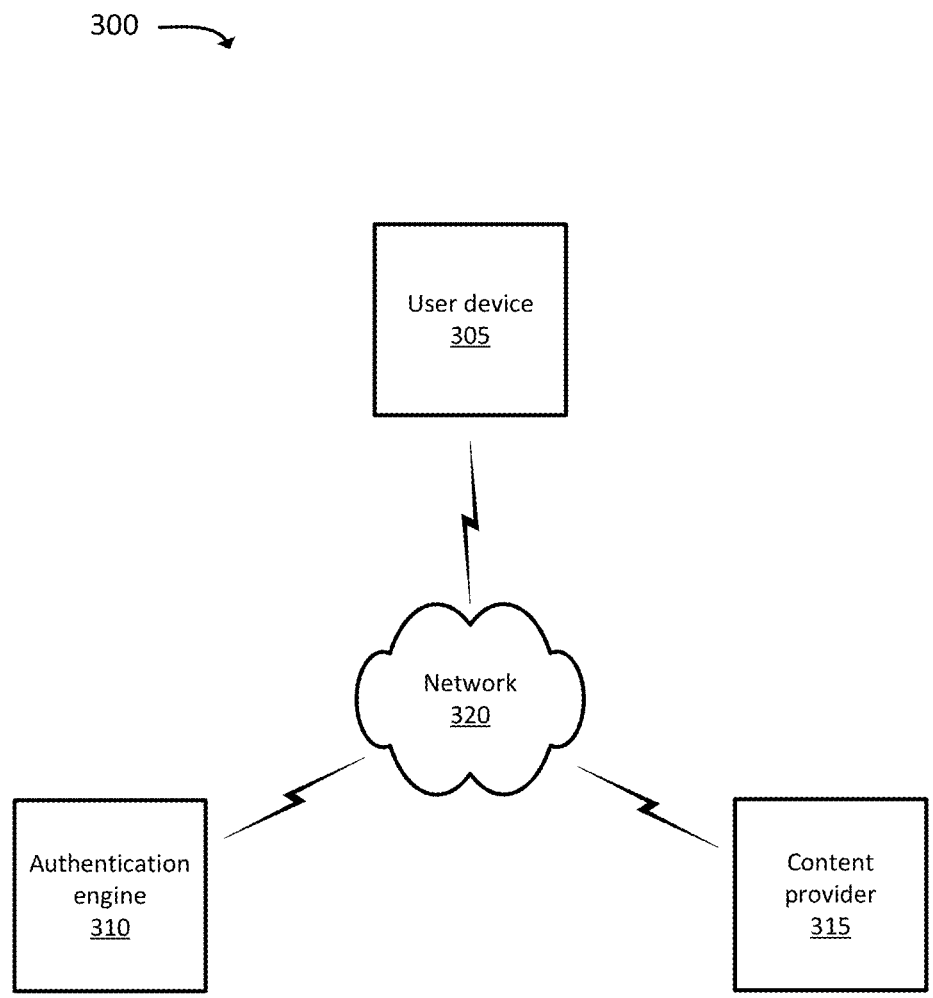
FIG. 3 illustrates an example environment, in which systems and/or methods, described herein, may be implemented.

FIG. 3 illustrates an example environment 300, in which systems and/or methods described herein may be implemented. As shown in FIG. 3, environment 300 may include user device 305, authentication engine 310, content provider 315, and network 320.

The quantity of devices and/or networks, illustrated in FIG. 3, is provided for explanatory purposes only. In practice, environment 300 may include additional devices and/or networks; fewer devices and/or networks; different devices and/or networks; or differently arranged devices and/or networks than illustrated in FIG. 3. For example, while not shown, environment 300 may include devices that facilitate or enable communication between various components shown in environment 300, such as routers, modems, gateways, switches, hubs, etc. Alternatively, or additionally, one or more of the devices of environment 300 may perform one or more functions described as being performed by another one or more of the devices of environments 300. Devices of environment 300 may interconnect with each other and/or other devices via wired connections, wireless connections, or a combination of wired and wireless connections. In some implementations, one or more devices of environment 300 may be physically integrated in, and/or may be physically attached to, one or more other devices of environment 300.

User device 305 may include any computation and communication device that is capable of communicating with one or more networks (e.g., network 320). For example, user device 305 may include a radiotelephone, a personal communications system ("PCS") terminal (e.g., a device that combines a cellular radiotelephone with data processing and data communications capabilities), a personal digital assistant ("PDA") (e.g., that can include a radiotelephone, a pager, Internet/intranet access, etc.), a smart phone, a laptop computer, a tablet computer, a camera, a television, a set-top device ("STD"), a personal gaming system, a wearable device, and/or another type of computation and communication device. In some implementations, user device 305 may be in communication with one or more other devices (e.g., a wearable device, such as a "smart watch," a device clipped on an article of clothing, a device attached to a piece of jewelry, a device placed in a pocket, or the like) via a personal area network ("PAN"). The PAN may be established using Bluetooth, Wi-Fi (e.g., based on an Institute of Electrical and Electronics Engineers Institute of Electrical and Electronics Engineers ("IEEE") 802.11-based standard), ZigBee (e.g., based on an IEEE 802.15.4-based standard), Near Field Communications ("NFC"), or the like). User device 305 may additionally, or alternatively, send and/or receive data to one or more other devices, such as authentication engine 310 and/or content provider 315, via one or more networks, such as network 320.

In accordance with some implementations, user device 305 (and/or a wearable device and/or another device in communication with user device 305) may include hardware circuitry and/or software logic to determine a magnetic declination associated with user device 305 (e.g., a direction towards which user device 305 is oriented (e.g., a direction that user device 305 is facing), in terms of degrees from north). In some implementations, user device 305 may receive information from another device (e.g., a wearable device or another type of device) regarding the orientation of the other device. For example, in some implementations, user device 305 may be in communication with a "smart watch," and may receive information regarding the orientation of the smart watch. In order to determine its orientation, user device 305 (or a wearable device and/or another device in communication with user device 305) may use one or more magnetic field sensors, one or more accelerometers, and/or may make use of other techniques.

User device 305 may communicate with authentication engine 310 in order to determine whether user device 305 should be in a private mode or a public mode. For instance, as described in more detail below, as part of an authentication process (e.g., an "unlocking" process, in which a user wishes to transition the phone out of a state in which a "lock" screen is displayed), user device 305 may provide the magnetic declination associated with user device 305 (e.g., the magnetic declination of user device 305 itself, and/or of another device communicatively coupled to user device 305) to authentication engine 310. User device 305 may receive a response from authentication engine 310, indicating whether user device 305 should be in private mode or public mode. As also described below, applications, running on user device 305, may present, send, and/or receive different types of information based on whether user device 305 is in private mode or public mode.

Authentication engine 310 may include one or more devices (e.g., a single server device or a cluster of server devices) that facilitate enhanced user authentication, in some implementations. For example, as described in further detail below, authentication engine 310 may receive setup information from user device 305, indicating a magnetic declination (e.g., in terms of degrees from north) associated with private mode authentication for user device 305. Once the setup information is received, authentication engine 310 may receive authentication requests from user device 305, including an orientation of user device 305 (e.g., a direction that user device 305 is facing or aligned), and may determine whether to authorize user device 305 in private mode or public mode. In some implementations, authentication engine 310 may notify user device 305 and/or content provider 315 when user device 305 has been activated in public mode and/or in private mode.

Content provider 315 may include one or more devices (e.g., a single server device or a cluster of server devices)

that send and/or receive data to user device 305. Content provider 315 may, for example, be an application server and/or a web server. In some implementations, content provider 315 may send and/or receive different types of information to and/or from user device 305, based on whether user device 305 is in private mode or public mode.

Network 320 may include one or more networks, via which one or more devices, such as shown in FIGS. 2 and 3, may communicate. For example, network 320 may include an evolved packet system ("EPS") that includes a Long-Term Evolution ("LTE") network and/or an evolved packet core ("EPC") network that operate based on a Third Generation Partnership Project ("3GPP") wireless communication standard. The LTE network may be, or may include, a radio access network ("RAN") that includes one or more base stations, some or all of which may take the form of an eNodeB ("eNB"), via which user device 305 and/or another device may communicate with the EPC network. The EPC network may include one or more serving gateways ("SGWs"), mobility management entities ("MMEs"), and/or packet data network ("PDN") gateways ("PGWs"), and may enable user device 305 to communicate with one or more PDNs (e.g., the Internet) and/or an Internet Protocol ("IP") Multimedia Subsystem ("IMS") core network. The IMS core network may manage authentication, session initiation, account information, a user profile, etc. associated with user device 305. Additionally, or alternatively, network 320 may include one or more PDNs, such as the Internet, a metropolitan area network ("MAN"), a local area network ("LAN"), a wide area network ("WAN"), a private enterprise network, etc.

Figure 4:
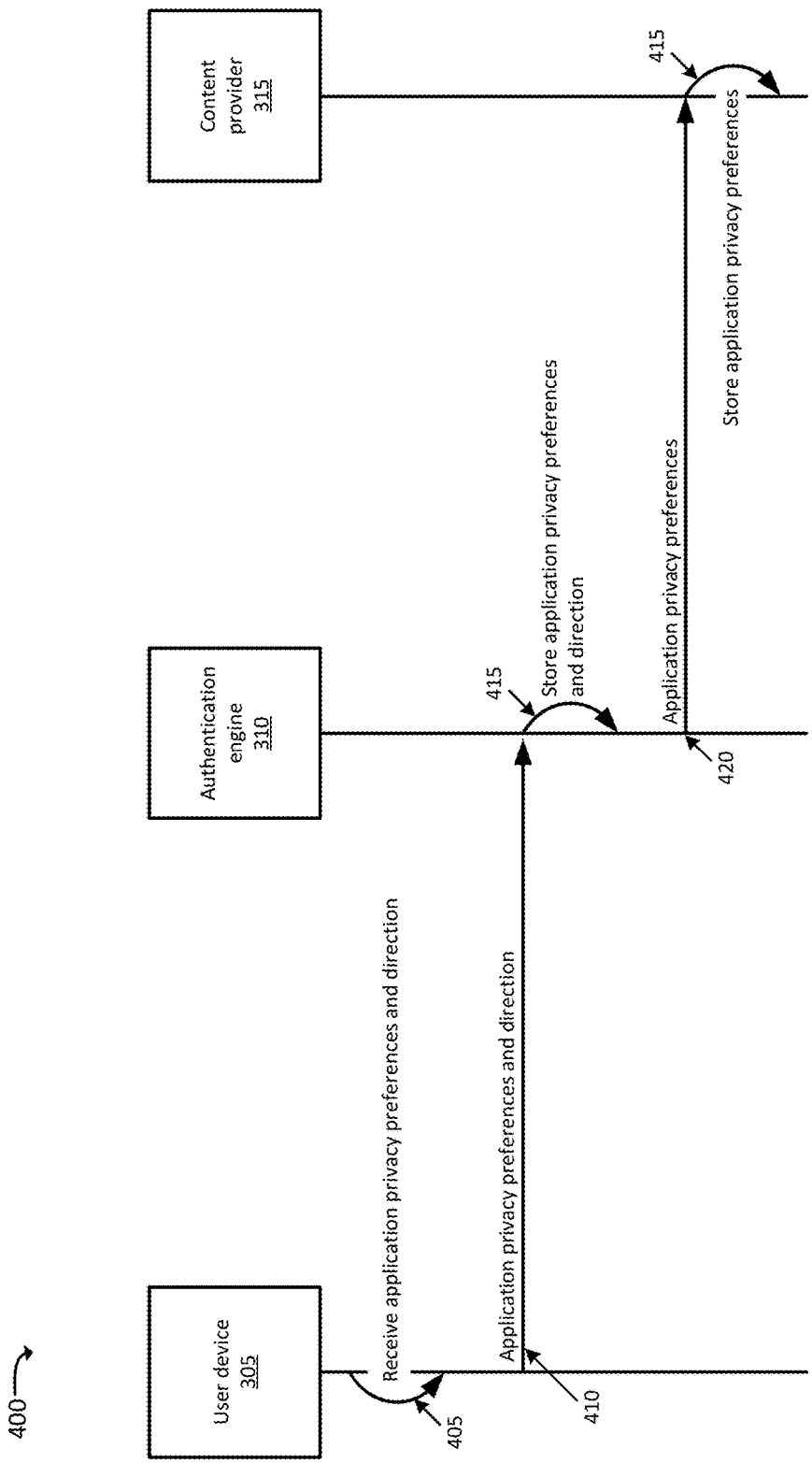
FIG. 4 illustrates an example signal flow of a registration process for an enhanced authentication procedure.

FIG. 4 illustrates a signal flow 400 of an example process for configuring the enhanced authentication of user device 305. As shown, user device 305 may receive (at 405) application privacy preferences associated with public mode, and a direction (e.g., an orientation, such as a magnetic declination) associated with private mode. For example, a user of user device 305 may access an application, running on user device 305, which provides for the specification of the privacy preferences and the direction.

Figures 5, 6:
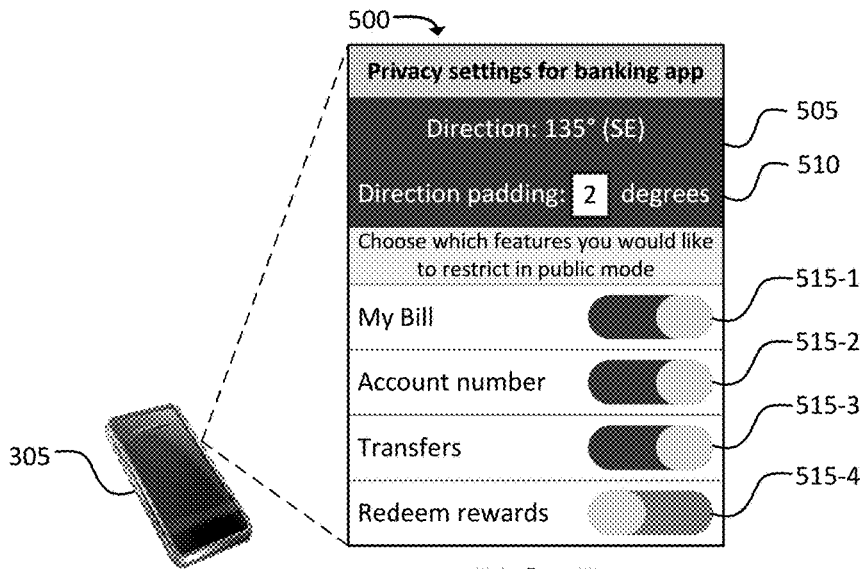
FIG. 5 illustrates an example user interface, which may be used to specify privacy parameters.
FIG. 6 illustrates an example data structure, which may be used to effect an enhanced authentication procedure.

An example user interface 500, which may be presented by user device 305, through which the privacy preferences and the direction can be specified, is illustrated in FIG. 5. As shown, user interface 500 may include display area 505, which may display the direction in which user device 305 is facing. As mentioned above, user device 305 may include hardware circuitry and/or software logic to determine the orientation of user device 305 is facing (e.g., the magnetic declination of user device 305, in terms of degrees from north). Additionally, or alternatively, display area 505 may include a text box (not pictured), through which the direction may be manually entered.

As further shown, user interface 500 may include display area 510, which may display a direction padding, and/or may include a text box that allows the user to specify the direction padding. The direction padding may be used as a margin of error, based on which user device 305 may still be considered as oriented towards the "correct" direction (i.e., the direction shown or specified in display area 505). For example, if a direction of 135 degrees from north is shown in display area 505 and a direction padding of 2 degrees is shown in display area 510, then user device 305 may be considered to be oriented towards the "correct" direction between 133 degrees from north and 137 degrees from north (i.e., 135 degrees from north, "padded" by 2 degrees in the positive and negative directions).

User interface 500 may further allow the specification of which features, for a particular application, the user would like to restrict in public mode (e.g., features for which the user desires to prevent the presentation, sending, and/or receiving of data). In this example, toggle switches 515-1 through 515-4 (hereinafter sometimes collectively referred to as "toggle switches 515," or individually as "toggle switch 515") are included in user interface 500. Each toggle switch 515 may correspond to a particular item of information, or a type of information. For example, toggle switch 515-1 corresponds to a "My Bill" item, toggle switch 515-2 corresponds to an "Account number" item, toggle switch 515-3 corresponds to a "Transfers" item, and toggle switch 515-4 corresponds to a "Redeem rewards" item. Toggle switches 515 may allow the user to specify, on a per-item basis, which information items should be restricted in public mode. In this example, toggle switches 515-1 through 515-3 may be activated, which indicates that the corresponding information items should be restricted in public mode.

In some implementations, while not explicitly shown here, user interface 500 (and/or an interface with similar functionality) may be presented after the user is authenticated by authentication engine 310 (e.g., user interface 500 may be presented after a user name and password is entered in a login screen). Also, while FIG. 5 is discussed in the context of privacy settings for a particular application, in some implementations, user interface 500 (or an interface with similar functionality) may include privacy options for multiple applications, and/or privacy options for an operating system of user device 305. In some implementations, some functionality of the example user interface 500 may be provided on distinct user interfaces. For instance, one user interface may be used to specify the direction and/or padding, while a different user interface may be used to specify privacy options. In some implementations, user interface may be presented as a "settings" option associated with a corresponding application itself. For instance, a banking application, installed on user device 305, may include a "settings" menu that includes some or all of the features shown in user interface 500. In some implementations, user interface 500 may be included in a standalone application that communicates with corresponding applications (e.g., via an application programming interface ("API")), in order to determine the types of information that can be restricted in public mode.

Returning to FIG. 4, user device 305 may output (at 410) the application privacy preferences and direction (received at 405) to authentication engine 310. In some implementations, the application privacy preferences may include information indicating to which application (or applications) the privacy preferences apply. This information may include, for example, a name of the application(s) and/or some other identifier.

Authentication engine 310 may store (at 415) the received application privacy preferences and direction. FIG. 6 illustrates an example data structure 600, which may be stored by authentication engine 310. As shown, data structure 600 may store information regarding the privacy preferences for different users. Users may be differentiated based on an identifier ("ID"), such as a mobile directory number ("MDN"), an International Mobile Subscriber Identity ("IMSI") value, an International Mobile Station Equipment Identity ("IMEI"), and/or another type of identifier. The privacy preferences, for a particular user, may be stored in a nested data structure 650. For example, as shown in FIG. 6, a particular instance of data structure 650 may correspond to a user with the user identifier of "111-222-3333."

Data structure 650 may include an application identifier, an application server uniform resource locator ("URL"), a direction, a padding, and privacy settings. The application identifier may include a name of an application and/or some other identifier of a particular application. The application server URL may include a URL and/or some other type of resource identifier (e.g., a uniform resource identifier ("URI"), an IP address, a port number, etc.) of one or more application servers (e.g., content provider 315) associated with a particular application. The application server URL may be pre-configured at authentication engine 310 (e.g., an administrator and/or some other source may provide information linking application identifiers to application server URLs). Additionally, or alternatively, the application server URL may be received (at 410) from user device 305 with the privacy preferences. The direction, padding, and privacy settings, shown in example data structure 650, may correspond to respective information received (at 410) from user device 305.

In some implementations, data structure 650 may include "global" settings, which may be used in the absence of application-specific settings (and/or may supplement existing settings). For instance, as shown, the "Stocks" application may not be associated with an application-specific direction and padding. In this situation, the "global" values of 177 and 3, respectively, may apply for the "Stocks" application. In contrast, the "Banking" application may include an application-specific direction and padding of 290 and 2, respectively. In some implementations, the application-specific direction and padding may be used in lieu of the global setting. In other implementations, the application-specific direction and padding may supplement the global setting (i.e., directions between the ranges of 174-180 degrees from north and 288-292 degrees from north may be considered to satisfy the specified direction and padding).

Returning again to FIG. 4, authentication engine 310 may output (at 420) application privacy preferences to a particular content provider 315 that is associated with a respective application. For instance, authentication engine 310 may use the "Application server URL" information, in data structure 650, to communicate with content provider 315. In the case of the "Banking" application, and referring to the example data in FIG. 6, authentication engine 310 may output the user identifier ("111-222-3333") and the privacy settings ("<Restrict bill, account number, transfers>") to content provider 315. Content provider 315 may store (at 415) the received privacy preferences for later use, as described below.

Figure 7:
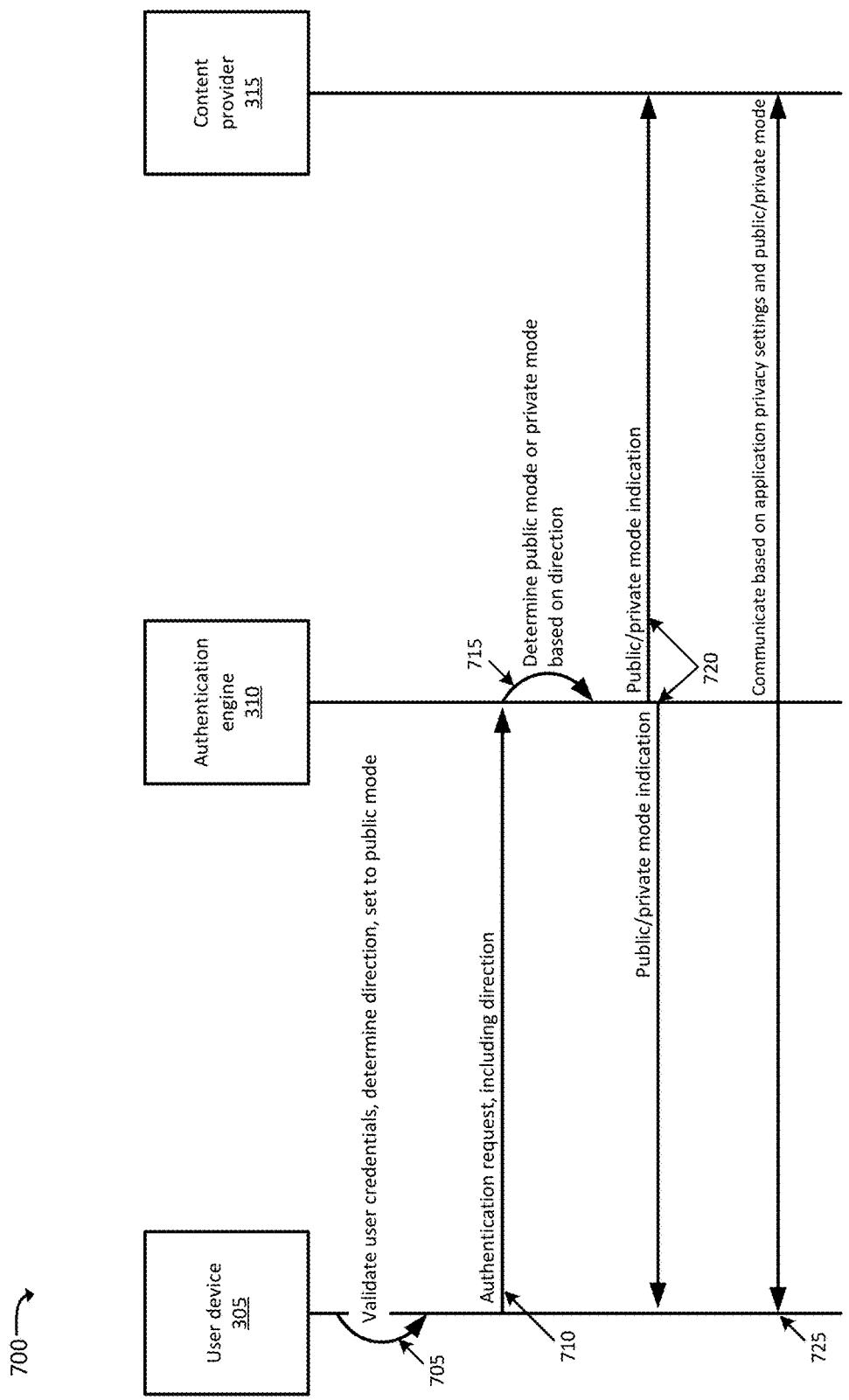
FIG. 7 illustrates an example signal flow of an enhanced authentication procedure using magnetic declination.

FIG. 7 illustrates a signal flow diagram 700 of an example enhanced authentication process using magnetic declination of user device 305. As shown, user device 305 may validate (at 705) user credentials, and determine a direction of user device 305. For instance, referring to the example shown in FIGS. 1 and 2, user device 305 may validate a PIN code, entered at a lock screen of user device 305. In other implementations, validating the user credentials (e.g., the PIN code) may be omitted, and/or the validation may be performed by authentication engine 310. The direction of user device 305 may, in some implementations, be determined using known techniques and/or their equivalents. Once the initial validation process has been completed (e.g., the entering of the PIN code at the lock screen), user device 305 may be unlocked and set to public mode. By setting user device 305 to public mode, immediate access may be granted to the user, while further authentication is performed in conjunction with authentication engine 310. In some implementations, if user device 305 does not have network connectivity, then user device 305 may default to a particular mode. For instance, in some implementations, user device 305 may default to private mode, while in other implementations, user device 305 may default to public mode.

As further shown, user device 305 may output (at 710) an authentication request to authentication engine 310. The authentication request may include an orientation of user device 305 when the validation credentials (e.g., the PIN code) were entered by the user (e.g., a magnetic declination of user device 305 at the time the validation credentials were entered by the user). In some implementations, the authentication request may include an identifier of one or more applications installed and/or running on user device 305. In some implementations, the authentication request may include an identifier of an "active" application running on user device 305 (e.g., an application running in the foreground, such as an application for which information is visibly presented on a screen of user device 305, and/or for which data was in the process of being sent and/or received by user device 305 before user device 305 was locked).

Authentication engine 310 may determine (at 715) whether user device 305 should be placed in public mode or private mode, based on the direction information provided by user device 305. For example, authentication engine 310 may compare the direction to the direction and padding information associated with user device 305 (and/or associated with one or more applications identified in the authentication request). As mentioned above, if the direction falls within the pre-configured direction and padding associated with user device 305 and/or the one or more applications, then authentication engine 310 may determine that user device 305 should be activated in private mode. If, on the other hand, the direction does not fall within the pre-configured direction and padding associated with user device 305 and/or the one or more applications, then authentication engine 310 may determine that user device 305 should be activated in public mode.

Authentication engine 310 may notify (at 720) user device 305 and/or content provider 315 regarding the public or private mode determination. User device 305 may present information (e.g., on a display of user device 305) based on the privacy mode settings. For example, in public mode, user device 305 may restrict the types of information shown on user device 305.

User device 305 and content provider 315 may communicate (at 725) based on the privacy mode settings. For example, in private mode, user device 305 may refrain from sending certain types of information to content provider 315, and/or content provider 315 may refrain from sending certain types of information to user device 305, thus potentially enhancing the privacy of the user of user device 305 and protecting the user from malicious users who may attempt to intercept communications to and/or from user device 305.

Figure 8:
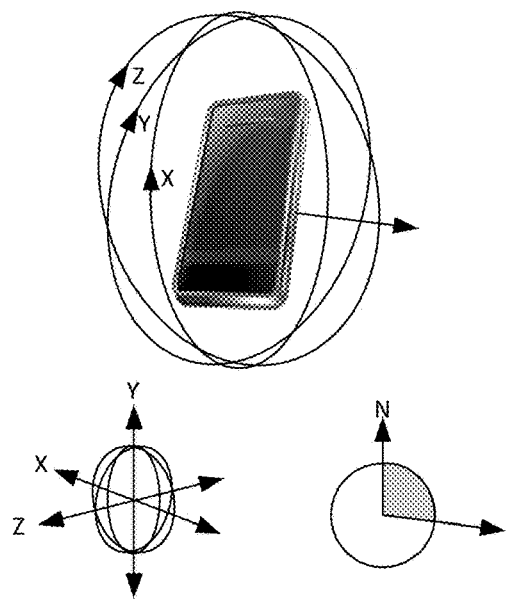
FIGS. 8 and 9 illustrate example implementations of other types of enhancements that may be used to further enhance an authentication procedure.

In some implementations, one or more additional measures or techniques may be used in the enhanced authentication techniques described herein. For example, as shown in FIG. 8, a three-dimensional local rotation of user device 305 may be used, in addition to the orientation of user device 305. For example, user device 305 may measure the acceleration along the X, Y, and Z principle axes of inertia, and may also determine rotation about these axes (also known as roll, pitch, and yaw), and further use this information when registering the privacy preferences and subsequently authenticating the user. As similarly described above, acceleration values along the X, Y, and Z axes and roll, pitch, and yaw rotations about them, may be displayed to the user while the user is registering privacy settings and/or attempting to unlock user device 305.

In some implementations, a local rotation pattern may be used in the enhanced authentication techniques described herein (e.g., instead of merely setting the local acceleration and rotation values to specific static X, Y, Z, yaw, pitch, and/or roll values). For example, a local rotation pattern may specify a sequence of yaw, pitch, and/or roll values.

Figure 9:
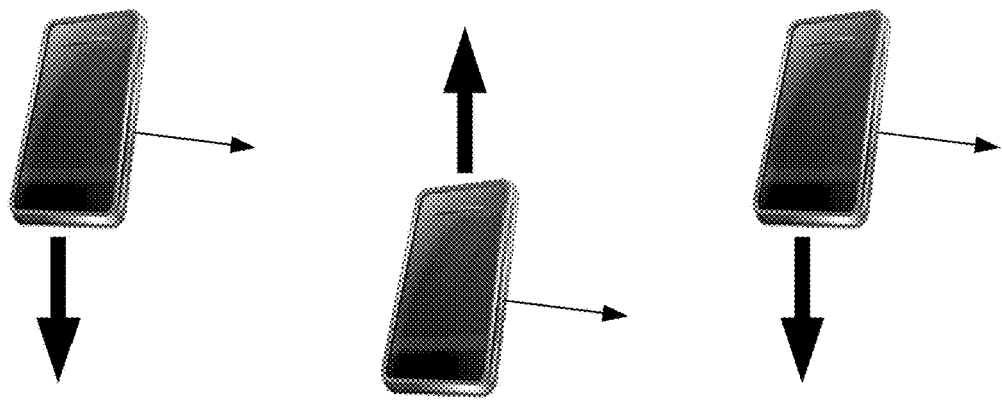

Additionally, or alternatively, as shown in FIG. 9, movement of user device 305 may be used in the enhanced authentication techniques described herein. For example, as shown in FIG. 9, a downward movement, followed by an upward movement, and finally followed by a downward movement (e.g., in addition to the direction user device 305 is facing) may be used. While FIGS. 8 and 9 illustrate examples of variations on techniques described herein, in practice, many different variations are possible. For instance, in some implementations, swiping gestures may be used in conjunction with facing direction. While discussed in the context of being used in conjunction with the orientation of user device 305 (e.g., a magnetic declination associated with user device 305), in some implementations, the acceleration and yaw, pitch, and/or roll rotations of user device 305, the movement of user device 305, and/or other techniques may be used in lieu of the orientation of user device 305, to determine whether user device 305 should be activated in private mode or public mode.

In some implementations, geographic location information may be used in conjunction with, or in lieu of, techniques described herein. For example, in some implementations, public mode may be disabled when the user is in a particular location (e.g., a location designated as a "safe" location, such as the user's home). Thus, in some such implementations, the direction may not be displayed on the lock screen or used as a factor in the authentication, by virtue of determining that the user is in the "safe" location. The "safe" location may be manually set by the user, and/or may be programmatically determined (e.g., by examining a profile associated with the user, which may include residence location information, office location information, popular locations visited, etc.). In some implementations, the public mode may be disabled by default, unless the user is in an "unsafe" location, such as a location determined to be associated with malicious users (e.g., based on previous reports from other users).

In some implementations, the identity of a network, to which user device 305 is connected, may be used in conjunction with techniques described herein. For example, in some implementations, public mode may be disabled when user device 305 is connected to a cellular network. As another example, public mode may be disabled when a service set identifier ("SSID") of a WiFi network, to which user device 305 is connected, is a "trusted" SSID. For example, the SSID may be an SSID of the user's home or office network. In some implementations, public mode may be disabled by default, and active when user device 305 is connected to an "unsafe" network. For example, an SSID that matches a default SSID that is provided with home wireless routers may be designated as "unsafe." Other examples of "unsafe" SSIDs may include SSIDs associated with airports or coffee shops, and/or SSIDS of open networks (e.g., networks that operate without encryption).

While implementations are described above in the context of the orientation of a user device, some implementations may utilize information from one or more other devices that are in communication with user device 305. For instance, public mode or private mode may be selected based on the orientation of a wearable device (e.g., a smart watch, a device attached to an article of clothing or item of jewelry, etc.) and/or another type of device (e.g., another type of device attached to or carried by a user of user device 305). For instance, the wearable device may determine its orientation (e.g., magnetic declination) and may provide the orientation information to user device 305, which may select public or private mode based on the orientation of the wearable device. In some implementations, other types of information, from another device, may be used when user device 305 selects public or private mode. For instance, in some implementations, user device 305 may be configured to enter private mode when facing a particular direction, and also when another particular device is within communication range of user device 305 (e.g., a smart watch is in communication with user device 305 via Bluetooth).

Figure 10:
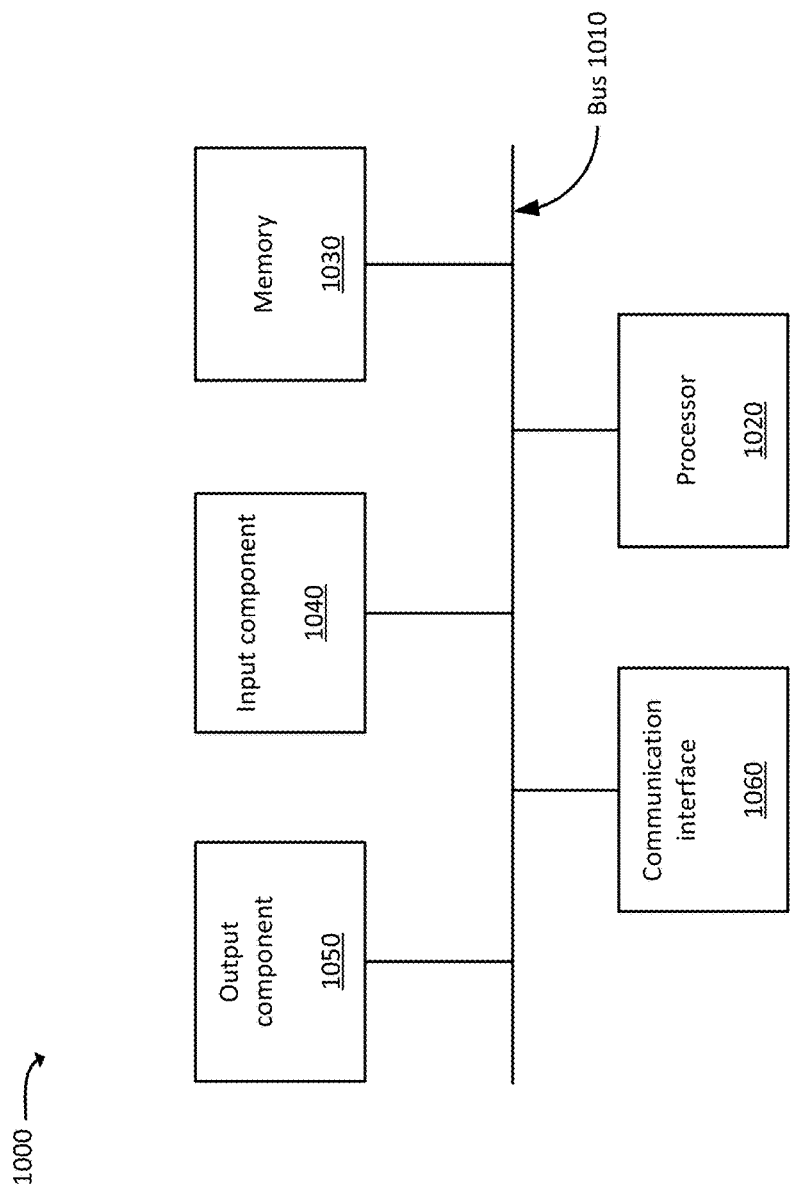
FIG. 10 illustrates example components of a device, in accordance with some implementations described herein.

FIG. 10 is a diagram of example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of signals have been described with regard to FIGS. 4 and 7, the order of the signals may be modified in other implementations. Further, non-dependent signals may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than threshold," "being greater than or equal to a threshold," "being less than a threshold," "being less than or equal to a threshold," or other similar terms, depending on the context n which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A user device, comprising:
a display device;
a memory device storing a set of processor-executable instructions; and
a processor configured to execute the processor-executable instructions, wherein executing the processor-executable instructions causes the user device to:
  present, via the display device, a lock screen indicating that the user device is in a locked state in which a particular application is inaccessible, wherein the lock screen includes:
    an option to provide authentication credentials via at least one of:
      a personal identification number ("PIN") code,
      biometric information associated with the user, or
      a swipe pattern, and
    a graphical element that displays a direction that the user device is facing;
  receive authentication credentials via the lock screen, the receiving including receiving at least one of the PIN, the biometric information, or the swipe pattern;
  validate the authentication credentials by validating at least one of the PIN code, the biometric information, or the swipe pattern;
  determine a direction that the user device is facing at a time that the validated authentication credentials were received;
  determine a sequence of orientations or movements, in three-dimensional space, of the user device;
  compare the direction that the user device is facing, at the time the authentication credentials were received, to a previously configured direction associated with a first unlocked mode;
  compare the sequence of orientations or movements to a previously configured sequence of orientations or movements associated with the first unlocked mode;
  select a particular unlocked mode, between the first unlocked mode or a second unlocked mode, based on:
    the comparison of the determined direction, that the user device is facing at the time the authentication credentials were received, to the previously configured direction associated with the first unlocked mode, and
    the comparison of the sequence of orientations or movements of the user device, the selecting including:
- selecting the first unlocked mode when the direction that the user device is facing, at the time the authentication credentials were received, matches the previously configured direction associated with a first unlocked mode and when the sequence of orientations or movements matches the previously configured sequence of orientations or movements associated with the first unlocked mode, and
- selecting the second unlocked mode when the direction that the user device is facing, at the time the authentication credentials were received, does not match the previously configured direction associated with a first unlocked mode or when the sequence of orientations or movements does not match the previously configured sequence of orientations or movements associated with the first unlocked mode,
- wherein the particular application is accessible in both the first unlocked mode and the second unlocked mode,
- wherein the second unlocked mode causes the user device, when the user device is in the second unlocked mode, to:
  - restrict the presenting, sending, or receiving of a first type of data, associated with the particular application, and
  - forgo restricting the presenting, sending, or receiving of a second type of data, associated with the particular application, and
- wherein the first unlocked mode causes the user device to forgo restricting the presenting, sending, or receiving of the first and second types of data, when the user device is in the first unlocked mode; and
- exit, after validating the authentication credentials and selecting the particular unlocked mode from between the first and second unlocked modes, the locked state by entering the selected particular unlocked mode and restricting or forgoing the presenting, sending, or receiving of data in accordance with the selected particular unlocked mode.

2. The user device of claim 1, wherein the direction that the user device is facing is based on a magnetic declination of the user device.

3. The user device of claim 1, wherein the lock screen further indicates an orientation of another device that is communicatively coupled to the user device,
- wherein the selection between the first unlocked mode or the second unlocked mode is further based on the orientation of the other device at the time that the authentication credentials are received.

4. The user device of claim 2, wherein executing the processor-executable instructions further causes the user device to:
- determine a local rotation, in three-dimensional space, of the user device, the local rotation including at least one of yaw, pitch, or roll,
- wherein the selection between the first unlocked mode or the second unlocked mode is further based on the local rotation of the user device.

5. The user device of claim 1, wherein executing the processor-executable instructions further causes the user device to:
- display, after receiving the authentication credentials, a confirmation screen that indicates which unlocked mode, of the first unlocked mode or the second unlocked mode, is being entered.

6. The user device of claim 5, wherein executing the processor-executable instructions, to display the confirmation screen, further causes the user device to:
- when the direction that the user device is facing matches a preconfigured direction associated with the second unlocked mode, indicate that the direction that the user device is facing matches the preconfigured direction associated with the second unlocked mode, and
- when the direction that the user device is facing does not match the preconfigured direction associated with the second unlocked mode, indicate that the direction that the user device is facing does not match the preconfigured direction associated with the second unlocked mode.

7. The user device of claim 1, wherein the sequence of orientations or movements includes at least three distinct orientations or movements of the user device in three-dimensional space.

8. The user device of claim 1, wherein the direction that the user device is facing is a first direction, wherein executing the processor-executable instructions further causes the user device to:
- determine, while the lock screen is presented, a second direction that the user device is facing subsequent to the facing the first direction,
- wherein the selection between the first and second unlocked modes is further based on whether the first and second directions match a previously stored set of directions associated with the first unlocked mode.

9. A device, comprising:
- a memory device storing a set of processor-executable instructions; and
- a processor configured to execute the processor-executable instructions, wherein executing the processor-executable instructions causes the device to:
  - receive and store information indicating:
    - a direction associated with a user device while the user device is in a locked state in which a particular application is inaccessible to a user of the user device, and
    - a sequence of orientations or movements of the user device, in three-dimensional space;
  - receive, subsequent to the storing of the information, a request to authenticate the user of a user device,
    - the request being sent by the user device after the user device has validated a first authentication factor;
    - the request including, as a second authentication factor:
      - a particular direction associated with the user device at a time that corresponds to the request to authenticate the user and while the user device is in the locked state, and
      - a particular sequence of orientations or movements sensed at the user device,
    - the request being outputted by the user device after the user device has validated a first authentication factor and has displayed the particular direction on a lock screen of the user device while the user device is in the locked state;
  - compare, based on the request, the particular direction to the stored direction;

compare, based on the request, the particular sequence of orientations or movements sensed at the user device to the stored sequence of orientations or movements;

select a particular unlocked mode, out of a set of modes that includes a first unlocked mode and a second unlocked mode, based on whether the particular direction matches the stored direction and whether the particular sequence of orientations or movements matches the stored sequence of orientations or movements, wherein the selection of the particular mode includes:

selecting the first unlocked mode when the particular direction matches the stored direction and when the particular sequence of orientations or movements sensed at the user device matches the stored sequence of orientations or movements, and selecting the second unlocked mode when the particular direction does not match the stored direction or when the particular sequence of orientations or movements sensed at the user device does not match the stored sequence of orientations or movements; and output, to the user device, a response that indicates the selected particular mode, out of the set of modes, the response causing the user device to enter either the selected particular unlocked mode indicated in the response, wherein when the selected particular unlocked mode is the second first unlocked mode, entering the selected particular unlocked mode causes the user device to:

restrict the presenting, sending, or receiving of a first type of information, associated with the particular application, and forgo restricting the presenting, sending, or receiving of a second type of information, associated with the particular application, and wherein when the selected particular unlocked mode is the first unlocked mode, entering the selected particular unlocked mode causes the user device to forgo restricting the presenting, sending, or receiving of the first and second types of information, associated with the particular application.

10. The device of claim 9, wherein the request further includes information identifying the particular application associated with the user device, wherein executing the processor-executable instructions further causes the device to:

output, to a server device associated with the particular application and based on the comparing, a notification regarding whether the particular direction matches the stored direction, wherein the server device is a separate device from the user device.

11. The device of claim 10, wherein when the notification, outputted to the server device, indicates that the particular direction does not match the stored direction, the server device is restricted from sending the first type of information to the user device but is permitted to send the second type of information to the user device.

12. The device of claim 10, wherein when the notification, outputted to the server device, indicates that the particular sequence of orientations or movements does not match the stored sequence of orientations or movements, the server device is restricted from sending the first type of information to the user device but is permitted to send the second type of information to the user device.

13. The device of claim 9, wherein the direction associated with the user device is based on an orientation of another device communicatively coupled to the user device.

14. The device of claim 13, wherein the orientation of the other device includes at least one of:

a magnetic declination of the other device, or a local rotation of the other device.

15. A method, comprising:

storing, by a device, information indicating:

a direction associated with a user device, and a sequence of orientations or movements, in three-dimensional space, associated with the user device;

receiving, subsequent to the storing of the information, an authentication request from the user device, the authentication request including, as a second authentication factor:

a particular direction associated with the user device at a time that corresponds to the authentication request, and a particular sequence of orientations or movements sensed at the user device, the authentication request being received from the user device after the user device has validated a first authentication factor and has displayed the particular direction on a lock screen of the user device while the user device was in a locked state in which a particular application is inaccessible to a user of the user device;

comparing, based on the request, the particular direction to the stored direction;

comparing, based on the request, the particular sequence of orientations or movements sensed at the user device to the stored sequence of orientations or movements;

selecting a particular unlocked mode, out of a set modes that includes a first unlocked mode and a second unlocked mode, based on whether the particular direction matches the stored direction and whether the particular sequence of orientations or movements matches the stored sequence of orientations or movements, the selecting including:

selecting the first unlocked mode when the particular direction matches the stored direction and when the particular sequence of orientations or movements sensed at the user device matches the stored sequence of orientations or movements, and selecting the second unlocked mode when the particular direction does not match the stored direction or when the particular sequence of orientations or movements sensed at the user device does not match the stored sequence of orientations or movements; and outputting, to the user device, a response that indicates the selected particular mode, out of the set of modes, the response causing the user device to enter the selected particular unlocked mode indicated in the response, wherein when the selected particular unlocked mode is the second unlocked mode, entering the selected particular unlocked mode causes the user device to:

restrict the presenting, sending, or receiving of a first type of information, associated with the particular application, and forgo restricting the presenting, sending, or receiving of a second type of information, associated with the particular application, and wherein when the selected particular unlocked mode is the first unlocked mode, entering the selected particular unlocked mode causes the user device to forgo restricting the presenting, sending, or receiving of the first and second types of information, associated with the particular application.

16. The method of claim 15, wherein the request further includes information identifying the particular application associated with the user device, the method further comprising:
outputting, to a server device associated with the particular application and based on the comparing, a notification regarding whether the particular direction matches the stored direction,
wherein the server device is a separate device from the user device.

17. The method of claim 16, wherein when the notification, outputted to the server device, indicates that the particular direction does not match the stored direction, the server device is restricted from sending the first type of information to the user device but is permitted to send the second type of information to the user device.

18. The method of claim 16, wherein when the notification, outputted to the server device, indicates that the particular sequence of orientations or movements does not match the stored sequence of orientations or movements, the server device is restricted from sending the first type of information to the user device but is permitted to send the second type of information to the user device.

19. The method of claim 15, wherein the stored direction comprises a range of directions.

20. The method of claim 15, wherein the particular direction is a magnetic declination associated with the user device.

* * * * *